US008898703B2

(12) United States Patent
Yang et al.

(10) Patent No.: US 8,898,703 B2
(45) Date of Patent: Nov. 25, 2014

(54) DIGITAL MULTIMEDIA BROADCASTING APPLICATION FORMAT GENERATING METHOD AND APPARATUS THEREOF

(75) Inventors: Seung-Jun Yang, Daejeon (KR); Hee-Kyung Lee, Daejeon (KR); Hui-Yong Kim, Daejeon (KR); Han-Kyu Lee, Daejeon (KR); Jin-Woo Hong, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 876 days.

(21) Appl. No.: 12/594,621

(22) PCT Filed: Apr. 7, 2008

(86) PCT No.: PCT/KR2008/001952
§ 371 (c)(1),
(2), (4) Date: Dec. 14, 2009

(87) PCT Pub. No.: WO2008/123724
PCT Pub. Date: Oct. 16, 2008

(65) Prior Publication Data

US 2010/0115549 A1 May 6, 2010

Related U.S. Application Data

(60) Provisional application No. 60/912,683, filed on Apr. 18, 2007.

(30) Foreign Application Priority Data

Apr. 5, 2007 (KR) ........................ 10-2007-0033898
Apr. 5, 2007 (KR) ........................ 10-2007-0033899

(51) Int. Cl.
*G06F 3/00* (2006.01)
*H04N 5/445* (2011.01)
*H04N 7/173* (2011.01)
*H04H 20/95* (2008.01)
*H04H 60/73* (2008.01)

(52) U.S. Cl.
CPC ............... *H04H 60/73* (2013.01); *H04H 20/95* (2013.01)
USPC .................. 725/50; 725/54; 725/86; 725/98; 725/105; 725/118

(58) Field of Classification Search
USPC ..................................... 725/86, 98, 105, 118
See application file for complete search history.

(56) References Cited

U.S. PATENT DOCUMENTS

2007/0039022 A1 2/2007 Kim et al.
2008/0018503 A1 1/2008 Kim et al.

FOREIGN PATENT DOCUMENTS

EP 2044770 4/2009
KR 1020070011093 A 1/2007

(Continued)

OTHER PUBLICATIONS

Kim, Hui Yong; Choo, Hyon-Gon; Kim, Munchurl; "Text of ISO/IEC CD 23000-9—Multimedia Application Format for Digital Multimedia Broadcasting", Jan. 2007, pp. 3-4,7, 21-26.*

(Continued)

*Primary Examiner* — Nasser Goodarzi
*Assistant Examiner* — Kyu Chae
(74) *Attorney, Agent, or Firm* — Ladas & Parry LLP

(57) ABSTRACT

Provided are method and apparatus for generating a digital multimedia broadcasting application format. The apparatus includes: generating metadata for DMB contents; and combining the generated metadata and the DMB contents, wherein the metadata includes copyright information for the metadata, user information for a user who consumes the DMB contents, and package table information for describing a package related to the DMB contents.

15 Claims, 1 Drawing Sheet

(56) References Cited

FOREIGN PATENT DOCUMENTS

| | | | |
|---|---|---|---|
| KR | 1020070018645 | A | 2/2007 |
| WO | 2005/031592 | A1 | 4/2005 |
| WO | 2006/001565 | A1 | 1/2006 |
| WO | 2008/000894 | A1 | 1/2008 |

OTHER PUBLICATIONS

Cho, Jun Ho, A Study on Multimedia Application Format for TV-Anytime based Broadcasting Content, 2006, School of Engineering Information and Communications University, pp. 18-40.*

WD942, "Package: Schema and Resolution", Internal working document (in ftp://tva:tva@ftp.bbc.co.uk/pub/Contributions/27_0403_San), TV-Anytime Forum, Mar. 27,004, pp. 1-22.

SP003v13 Part A, "Specification Series: S-3 on Metadata (Normative) Part A: Metadata Schemas", TV-Anytime Forum, Dec. 15, 2002, pp. 1-161.

SP003v13 Part B, "Specification Series: S-3 on Metadata (Normative) Part B: System Aspects in a Unidirectional Environment", TV-Anytime Forum, Dec. 15, 2002, pp. 1-63.

International Search Report: PCT/KR2008/001952.

Hui Yong Kim, et al; "Requirements for DMB MAF", ISO/IEC JTC1/SC 29/WG 11, M13859, XP030042527, Oct. 18, 2006; 8 pages.

Hui Yong Kim, et al; "Proposed Text for ISO/IEC CD 23000-9, Digital Multimedia Broadcasting Application Format", ISO/IEC JTC 1/SC 29/WG 11, MPEG2007/M14163, XP030042819, Jan. 10, 2007; 44 pages.

Florian Schreiner, et al; "MAF Overview", ISO/IEC JTC1/SC29/WG11, MPEG2007/N8781, XP030015275, Jan. 19, 2007, 88 pages.

Hui Yong Kim et al; "Restricted TV-Anytime Metadata for Multimedia File Formats", 2007 $80^{th}$ MPEG Meeting, Apr. 24, 2007; 16 pages.

* cited by examiner

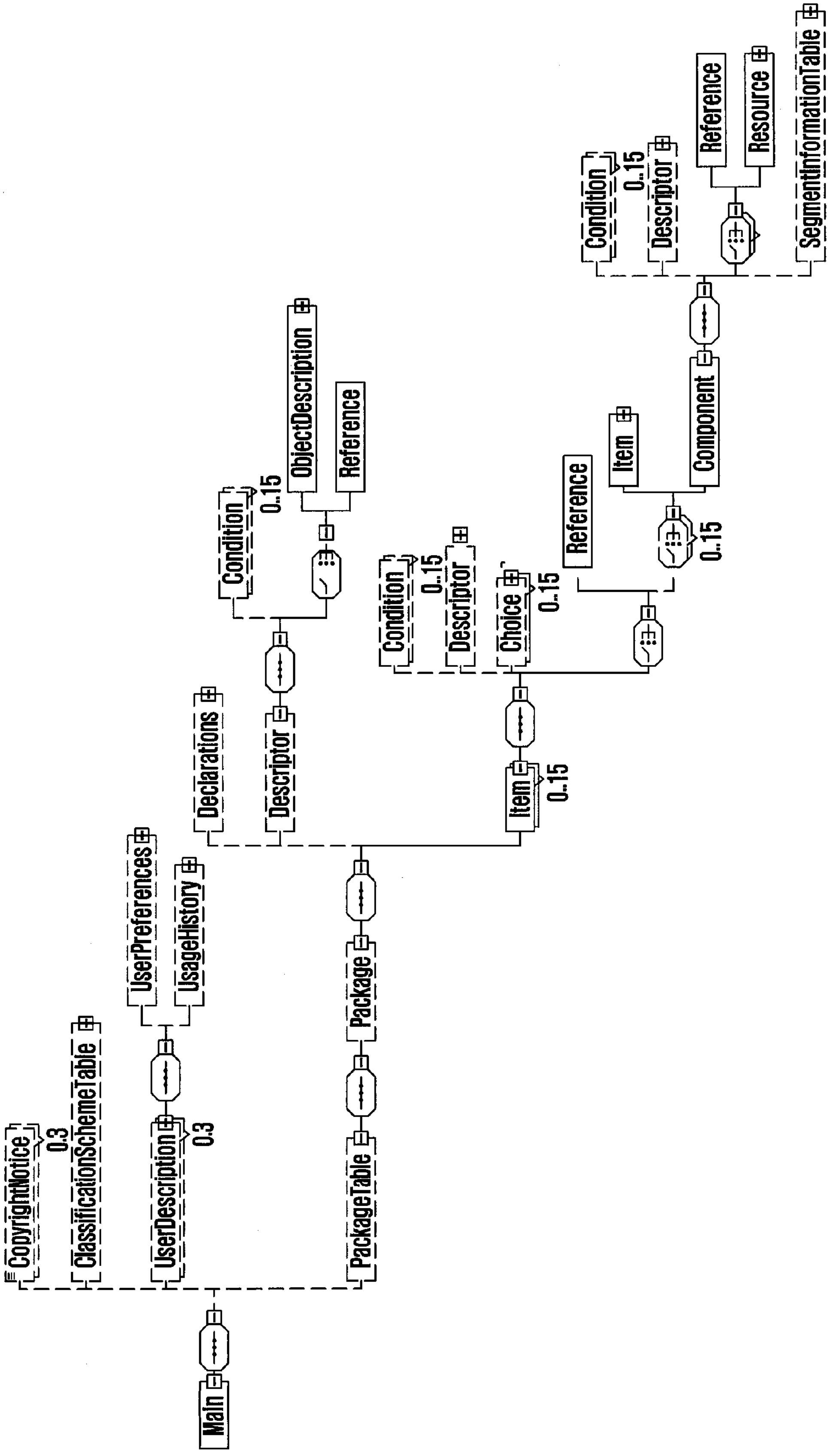
Main
CopyrightNotice
0..3
ClassificationSchemeTable
UserDescription
0..3
UserPreferences
UsageHistory
PackageTable
Package
Declarations
Descriptor
Condition
0..15
ObjectDescription
Reference
Item
0..15
Condition
0..15
Descriptor
Choice
0..15
Reference
Item
Component
0..15
Condition
0..15
Descriptor
Reference
Resource
SegmentInformationTable

DIGITAL MULTIMEDIA BROADCASTING APPLICATION FORMAT GENERATING METHOD AND APPARATUS THEREOF

TECHNICAL FIELD

The present invention relates to a method for generating an application format (AF) and an apparatus thereof; and, more particularly, to a method for generating Digital Multimedia Broadcasting (DMB) AF and an apparatus thereof.

This work was supported by the information and communication standard development supporting program of MIC/IITA [2007-P10-05, "The Development of Metadata Standard for DMB"].

BACKGROUND ART

Digital Multimedia Broadcasting (DMB) is a broadcasting service for modulating video and audio to digital data and providing the digital data to a stationary terminal or a portable terminal. DMB is a digital mode of multimedia broadcasting that provides a high quality audio, data, and video service and provides superior fixed and mobile receipt quality. According to the transmission scheme, DMB is classified into Terrestrial DMB and Satellite DMB.

If structural information of DMB contents and detail information of the DMB contents are not provided when DMB contents are provided, a user may not properly consume the DMB contents. Therefore, there is a demand for developing a method for storing and identifying DMB contents and describing the characteristics thereof. There is also a demand for developing a method for describing supplementary contents that are provided with the DMB contents.

DISCLOSURE

Technical Problem

An embodiment of the present invention is directed to providing a method for providing structural information of Digital Multimedia Broadcasting (DMB) contents and detail information thereof, storing, identifying DMB contents, and describing the characteristics thereof.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for generating Digital Multimedia Broadcasting (DMB) Application Format (AF), including: generating metadata for DMB contents; and combining the generated metadata and the DMB contents, wherein the metadata includes copyright information for the metadata, user information for a user who consumes the DMB contents, and package table information for describing a package related to the DMB contents.

In accordance with another aspect of the present invention, there is provided an apparatus for generating Digital Multimedia Broadcasting Application Format, including: a metadata generator for generating metadata for DMB contents; and a combiner for combining the generated metadata and the DMB contents, wherein the metadata includes copyright information for the metadata, user information for a user who consumes the DMB contents, and package table information for describing a package related to the DMB contents.

In accordance with another aspect of the present invention, there is provide a method for consuming a Digital Multimedia Broadcasting Application Format, including: receiving a DMB AF having DMB contents and metadata thereof; and consuming the DMB contents using the DMB AF, wherein the metadata includes copyright information for the metadata, user information for a user who consumes the DMB contents, and package table information for describing a package related to the DMB contents.

In accordance with another aspect of the present invention, there is provide an apparatus for consuming a Digital Multimedia Broadcasting Application Format, including: a receiver for receiving a DMB AF having DMB contents and metadata thereof; and a consuming unit for consuming the DMB contents using the DMB AF, wherein the metadata includes copyright information for the metadata, user information for a user who consumes the DMB contents, and package table information for describing a package related to the DMB contents.

In accordance with yet another aspect of the present invention, there is provided a computer-readable recording medium for storing metadata for Digital Multimedia Broadcasting (DMB) contents, wherein the metadata includes copyright information for the metadata, user information for a user who consumes the DMB contents, and package table information for describing a package related to the DMB contents.

Advantageous Effects

According to the present invention, Digital Multimedia Broadcasting (DMB) contents can be effectively consumed by providing a method for providing structural information and detail information of DMB contents, identifying DMB contents, and describing characteristics thereof when DMB contents are stored, modified, or distributed.

BRIEF DESCRIPTION OF THE DRAWINGS

FIG. 1 is a diagram illustrating a structure of metadata for Digital Multimedia Broadcasting (DMB) contents in accordance with an embodiment of the present invention.

BEST MODE FOR THE INVENTION

Hereinafter, aspects of the invention will be exemplary described. Those skilled in the art may embody the fundamentals of the invention and invent various apparatuses having concepts and a scope of the invention although the invention is not clearly described or illustrated in the specification. Conditional terms and embodiments in the specification are only intended to clearly describe concepts of the invention, and it must be understood that the invention is not limited by the conditional terms and embodiments.

Also, it must be understood that all of descriptions of fundamentals, aspects, embodiments of the invention, and a certain embodiment are intended to include structural and functional equivalents thereof. Furthermore, it must be understood that such equivalents include not only well-known equivalents but also all of equivalents that will be invented to perform the same function in regardless of a structure thereof.

Therefore, it must be understood that a block diagram of the specification shows conceptual aspects of an exemplary circuit for embodying fundamentals of the invention. Similarly, all flowcharts, a state transition diagram, pseudo codes may substantially represent computer-readable medium, and various processes performed by a computer or a processor although the computer or the processor is not clearly illustrated.

Functions of various devices shown in a drawing including functional blocks shown as processors or similar concepts may be provided not only using dedicated hardware but also using hardware capable of performing predetermined software. When the functions are provided by a processor, the functions may be provided by a single dedicated processor, a single shared processor, or a plurality of individual processors. Among them, some may be shared.

Terms used for a processor, control, or similar concepts may not be understood by exclusively citing hardware capable of performing software, and may be understood to suggestively include a digital signal processor (DSP) hardware, a read only memory (ROM), a random access memory (RAM), and nonvolatile memory for storing software without limitation.

In claims, constituent elements expressed as means for performing functions described in the specification are intended to include combination of circuit devices for performing the functions and all methods performing the functions including all types of software having firmware/micro codes. Also, the constituent elements are connected to a proper circuit for performing the software to perform the functions. Any means providing the functions must be understood as equivalent to those understood from the specification because the invention defined by the claims is combined with functions provided by the various described means and combined with methods required by the claims.

The advantages, features and aspects of the invention will become apparent from the following description of the embodiments with reference to the accompanying drawings, which is set forth hereinafter. Therefore, those skilled in the art may easily embody technical aspects of the invention. For simplicity and clarity of illustration, the drawing figures illustrating the general manner of construction, and descriptions, and details of well-known features and techniques may be omitted to avoid unnecessarily obscuring the invention. Hereinafter, preferred embodiments of the present invention will be described in detail with reference to the accompanying drawings.

A method and apparatus for generating a Digital Multimedia Broadcasting (DMB) application format according to the present invention generate metadata for DMB contents and combines the formed metadata with DMB contents in an application formation (AF). Therefore, a user is enabled to identify each DMB contents in storing, modifying, and distributing DMB contents and to effectively consume DMB contents by providing structural information and detail information of DMB contents to a user.

A user wants diverse information related to DBM contents. For example, when a user watches a predetermined program, the user may want to know about a restaurant shown in the predetermined program or a website related to the predetermined program. In order to satisfy such a demand, the present invention proposes a method for packaging various types of DMB contents in one file and enabling a user to consume the packaged file. In the method, upper level information of packaged contents, and a list of stored contents and relation information thereof are described. Also, a content type and detail information of content are confirmed. Hereinafter, the method according to the present invention will be described in detail.

First Embodiment

Method for Generating Digital Multimedia Broadcasting (DMB) Application Format (AF)

A method for generating a DMB AF in accordance with an embodiment of the present invention includes generating metadata for DMB contents and combining the generated metadata and DMB contents. The metadata includes copyright information for metadata, user information on a user who consumes DMB contents, and package table information describing a package related to DMB contents.

The metadata describes structural information and detail information of DMB contents. The metadata includes not only information about the DMB contents itself but also characteristics of a user who consumes DMB contents and supplementary contents related to the DMB contents.

Here, the package denotes a set of content components which can be combined with main contents such as DMB contents. The package may include components, items, or descriptors. The package enables a user to have more rich experience while consuming DMB contents. The package may have independent relation with or dependent relation with the main contents. As an example of the dependent relation, the package is dependent to a scenario of DMB contents such as detail information on a location included in a scenario of DMB contents or advertisement information of accessories shown in DMB contents.

In a DMB AF, metadata for DMB contents is combined with DMB contents. The combination of DMB contents and metadata is not limited to physical combination. That is, the DMB AF may be unitized by combing the DMB contents and metadata thereof in one file. Although the DMB contents and the metadata thereof are not combined in one file, the DMB contents and the metadata may be combined with reference information to each other included.

Hereinafter, the metadata for DMB contents will be described.

<Metadata>

FIG. 1 is a diagram illustrating a structure of metadata for DMB contents in accordance with an embodiment of the present invention.

The metadata for DMB contents according to the present embodiment is for providing detail information on DMB contents. The metadata for the DMB contents includes copyright information for metadata, user information on a user who consumes DMB contents, and package table information for describing a package related to DMB contents.

The metadata may include an upper most node having copyright information, user information, and package table information. The upper most node, as shown in FIG. 1, may be expressed as 'Main', and roles as a root element of the metadata. The upper most node may include information on a language and a version of the metadata.

The metadata may further include classification scheme table information. The classification scheme table information describes information on a classification scheme and may be expressed as 'ClassificationSchemeTable'. The classification scheme may be stored in a user terminal in advance. Or, a user terminal supporting a DMB AF according to the present embodiment may receive the classification scheme through a DMB AF file. In this case, the 'Main', the upper most node, includes copyright information 'CopyrightNotic', user information 'UserDescription', package table information 'PackageTable', and classification scheme table information 'ClassificationSchemeTable' as lower components.

The copyright information describes information related to composing metadata, and may be expressed 'CopyrightNotice'. The copyright information may include information on a service provider who composes the metadata and show it to a user. The service provider information includes information a broadcasting station, a related organization, or a related company. For example, the service provider information may be information about a broadcasting station such as KBS, NBC, CNN, or NHK.

The user information describes information on a user who consumes DMB contents and may be expressed as 'UserDescription'. The user information includes preference information and history information, thereby enabling a service provider to provide a user customized service according to the user preference and the history of watching programs. The user information may be used in a terminal only when a user does not want to provide own information in order to protect the user information from outflow. In this case, the user terminal may include a protected property. The user information may include user preference information and user usage history information for describing preference of a user for DMB contents.

The user preference information is information describing a user's preference for DMB contents and may be expressed as 'UserPreference'. The user preference information has preference information of individual user for programs. The user preference information may be protected not to be shown to others when the other accesses the user terminal. By recording the user preference information for each program, a bidirection service provider can suggest programs that an individual user may like, or advertize programs to an individual user.

The user preference information may include classification information and preference information for a user as lower components. The classification information may be expressed as 'UserIdentifier', and the preference information may be expressed as 'FilteringAndSearchPreference'. The classification information provides classification information of individual user, and the preference information may provide preference information of individual user.

The usage history information may be information on a usage history of an individual user. The usage history information records information on what programs a user watched previously and how long a user watched a corresponding program using a user terminal. Such information may be used by each broadcasting station for an audience rating survey of each program through an audience rating survey information collecting server.

The usage history information is a lower component and may include identification information for a user and a use action history of a user for DMB contents. The identification information may be expressed as 'UserIdentifier', and the user action history may be expressed as 'UserActionHistory'. The identification information provides identification information of individual user, and the user action information provides a consuming history of individual contents. The consuming history includes information on playback, search, or inquiry history of DMB contents.

The package table information describes a package related to DMB contents, and may be expressed as 'PackageTable'. The package table information may describe various types of content items related to the DMB contents. The package is a content that can be consumed with the main contents, thereby enabling a user to experience richer media. The package includes items, components, and descriptors. The package may be independent to or dependent from the main contents. As an example of the dependent package, the package may be detail information on a location introduced in a scenario of the main contents or advertisement contents for accessories shown in a scenario of the main contents The package table information may include package information defining a package as a lower component. The package information provides a content map stored in the DMB AF and may be expressed as 'Package'. The package information may include Content Reference Identifier (CRID) information.

The package information may include declaration information for defining frequently referenced information, description information for describing a package, and item information for defining elements included in a package.

The declaration information may be expressed as 'Declaration'. The declaration information provides convenience to generate and analyze metadata by reusing frequently used components such as contents, content segments, and description information for contents after defining them. The declaration information may include information on items, components, or descriptor. These will be described in detail in later.

The description information may be expressed as 'Descriptor'. The description information is a set of information on content sets included in the DMB AF. For example, information on a title of contents "Kapdoree's English conversation class for beginner, a first session", and a producer is provided. A user may decide whether it will be consumed or not through the description information thereof basically. A corresponding lecture may be configured as a set of various contents such as audio, video, and related broadcasting web site (BWS).

The item information may be expressed as 'Item'. A single content format may include a list of selectable contents, detail description information for individual contents, and location information of each content. A multiple content format includes selection condition for selecting a lowest single content format and location information for a single content format. An element may include a component or a descriptor.

The item information includes condition information for selecting an item included in an element as a lower component, item description information for describing an item, item selection information, reference information, lower item information, and component information for describing components included in an element.

The condition information may be expressed as 'Condition'. The condition information includes information on meaningful conditions for an item. For example, in case of a content item having a first chapter and a first verse, the condition information is used to decide whether detail information of the first verse is shown to a user or not according to whether the first chapter is selected or not. Also, the condition information is used to decide whether a use can playback a content item or not according to whether a film rating of the content item is R or not. The condition information may include properties for a requirement condition or an exception condition.

The item description information may be expressed as 'Item'. The item description information provides detail description information of an item.

The selection information may be expressed as 'Choice'. In a single content format, the selection information may mean a list of contents, for example, AV, BWS, and TPEG. In a multiple content format, the selection information may mean a list of content selection conditions, for example, 'friends first episode package' or 'friends second episode package. The selection information may include condition information 'Condition', description information 'Descriptor', and selection information 'Selection' as lower components. The selection information describes selectable content items or items for selectable conditions. Thus, it is possible to connect selection conditions with contents (item or component) related thereto through condition information. The selection information may include condition information 'Condition' and description information 'Descriptor' as lower components of the selection information.

The reference information may be expressed as 'Reference' and includes information on references of an element of a package.

The lower item information may be expressed as 'Item'. Since the lower item information is identical to the item information, the detail information thereof is omitted.

The component information may be expressed as 'Component'. In case of the single content format, the component information may include detail description information of individual content and location information for content. In case of the multiple content format, the component information may include location information of a lowest single content format.

The component information may include component condition information for selecting components, component description information for describing components, reference information, resource information for describing resource types for components and identifiers, and segment information table information for segment.

The component condition information may be expressed as 'Component'. The component condition information may include meaningful condition information for a component.

The component description information may be expressed 'Descriptor'. The component description information includes detail description information for a component.

The reference information may be expressed as 'Reference'. The reference information includes information for a reference of an element of a package.

The resource information may be expressed as 'Resource'. The resource information may include identification information of individual content. The resource information may include resource type information for describing a type of content as a lower component thereof. The resource type information may be expressed as 'ResourceType'. As a lower component of the resource type information, the resource type information may include name information for identifying content. The name information may be expressed as 'Name'.

The segment information table information may be expressed as 'SegementInformationTable'. The segment information table information provides a method for accessing, reproducing or watching stored programs by segments to a user. A segment browsing service may be provided based on the segment information table information.

As lower components, the component description information may include condition information for component description information, object description information for describing DMB contents, and reference information. The condition information may be expressed as 'Condition', the reference information may be expressed as 'Reference, and the object description information may be expressed as 'ObjectDescriptor'. Since the condition information and the reference information were already described in detail, the detail description thereof is omitted.

The object description information may include text based description information and the content description information as lower components. The text based description information may be expressed as 'Description, and provide text based description information for individual content.

The content description information may be expressed as 'ContentDescription'. The content description information provides a defined data structure for individual content or schema based detail information. As a lower component, the content description information may include a title information 'Title', media title information 'MediaTitle', short title information 'ShortTitle', synopsis information 'Synopsis', genre information 'Genre', film rating information 'Parentalguidance', language information 'Language', caption language information 'CaptionLanguage', sign language information 'SignLanguage', credit list information 'Creditslist', related content information 'RelatedMaterial', production data information 'ProductionDate', production location information 'ProductionLocation', viewing duration information 'Duration', content property information 'ContentProperties' for describing properties for supplementary contents, and source location information 'SourceLocation'.

The title information may provide a title of content to a user. The media title information may provide detail information for a representative image, video, and audio for stored contents to a user. The short title information may provide information on a short title for contents to a user. The synopsis information may provide a plot of contents to a user. The genre information may provide information for genre such as drama and sport to a user. The film rating information may provide film rating information for contents to a user, thereby informing of whether teenagers can watch contents or not. The language information may provide information about a language used to compose related contents. The caption language information may provide information on a language of a caption when a program includes a caption. The sign language information may provide a type of a sign language for a hearing impairment person. The credit list information may provide detail information for individuals in contents such as a hero, a heroine, and a director. The related content information may provide information on related other contents. The production data information and the production location information may provide information on a data and a time of producing contents, and a nation of producing the contents. The viewing duration information may provide information on an overall watching duration of a program. The content property information may provide information on properties for supplementary contents to a user. The source location information may provide source location information of contents. In case of unidirection, the source location information provides information on a broadcasting channel and a broadcasting time. In case of bidirection, the source location information provides a Uniform Resource Locator (URL) of a server.

The property information may include content type information for describing a type of supplementary contents, file property information, content attribute information, and context attribute information as lower components.

The content type information may be expressed as 'ContentType' and provide information on a type of content. The file property information may be expressed as 'FileProperties' and describe file properties. The content attribute information may be expressed as 'ContentAttributes' and described attributes of contents by a format. The context attribute information may be expressed as 'ContextAttributes' and describe attributes of content by context.

As a lower component, the content attribute information may include audio attribute information, video attribute information, and still image attribute information. The audio attribute information may be expressed as 'AudioAttributesType' and describe attributes of an audio content. Here, the audio attribute information may describe coding schemes Coding and number of channels NumOfChannels. The video attribute information may be expressed as ‘VideoAttributesType’ and described attributes of a video content. Here, the video attribute information may describe a horizontal size, a vertical size, and colors. The still image attribute information may be expressed as ‘StillImageContentAttributesType’ and describe attributes of a still image content. Here, the still image attribute information may describe a width, a height, and orientation.

As a lower component, the context attribute information may include data broadcasting attribute information, advertisement attribute information, education attribute information, application program attribute information, and game attribute information. The broadcasting attribute information may be expressed as ‘DataBroadcastingContextAttributesTpe’ and describe attributes of a data broadcasting content. Here, the data broadcasting attribute information may describe an interactive content service, a rendering style, and an update cycle. The advertisement attribute information may be expressed as ‘InterstitialContextAttributesTpe’ and describe properties of an advertisement content. Here, the advertisement attribute information may describe brand names. The education attribute information may be expressed as ‘EducationContextAttributesTpe’ and describe attributes of educational content. Here, the education attribute information may describe an intended user and an educational type. The application program attribute information may be expressed as ‘ApplicationContextAttributesTpe’ and describes attributes of application program content. Here, the application program attribute information describes attributes of application program content. The game attribute information may be expressed as ‘GameContextAttributesTpe’, and describe attributes of game contents. Here, the game information may describe the maximum number of players.

The content type information may be classified by a classification scheme including a slide show, a broadcasting web site (BWS), traffic and travel information (TTI), bi-directional data broadcasting based on binary format for scenes (BIFS), Java middlet, and a timed text. The TTI may be classified into a Point Of Interest (PI) and Public Transport Information (PTI).

A conventional classification scheme for classifying contents is very simple, such as video and audio. However, the conventional classification scheme has limitation in order to suitably provide various contents to a user. In the present invention, information on various content types can be provided.

Table 1 shows a classification scheme for content type information in accordance with an embodiment of the present invention.

TABLE 1

```
–   <Term termID=“1”>
    <Name xml:lang=“en”>Audio</Name>
    </Term>
–   <Term termID=“2”>
    <Name xml:lang=“en”>Video</Name>
    </Term>
–   <Term termID=“3”>
    <Name xml:lang=“en”>StillImage</Name>
    </Term>
–   <Term termID=“4”>
    <Name xml:lang=“en”>Text</Name>
    </Term>
–   <Term termID=“5”>
    <Name xml:lang=“en”>DataBroadcasting</Name>
    </Term>
```

TABLE 1-continued

```
–   <Term termID=“6”>
    <Name xml:lang=“en”>Interstitial</Name>
    </Term>
–   <Term termID=“7”>
    <Name xml:lang=“en”>Education</Name>
    </Term>
–   <Term termID=“8”>
    <Name xml:lang=“en”>Application</Name>
    </Term>
–   <Term termID=“9”>
    <Name xml:lang=“en”>Game</Name>
    </Term>
–   <Term termID=“10”>
    <Name xml:lang=“en”>Package</Name>
    </Term>
–   <!-- newly included CS for MAF for DMB
    -->
–   <Term termID=“11”>
    <Name xml:lang=“en”>SlideShow</Name>
    <Definition xml:lang=“en”>The service providing figure,
photograph or a text, and etc. in the form of the
successive images</Definition>
–   <Term termID=“11.1”>
    <Name xml:lang=“en”>DLS Only</Name>
    </Term>
–   <Term termID=“11.2”>
    <Name xml:lang=“en”>JSS Only</Name>
    </Term>
–   <Term termID=“11.3”>
    <Name xml:lang=“en”>SLS</Name>
    </Term>
    </Term>
–   <Term termID=“12”>
    <Name xml:lang=“en”>BWS</Name>
    <Definition xml:lang=“en”>The broadcast service in
which the return channel provides the web service since a
terminal receives in advance and it saves all files
relating to a website</Definition>
    </Term>
–   <Term termID=“13”>
    <Name xml:lang=“en”>TTI</Name>
    <Definition xml:lang=“en”>The traffic information and
advanced traveler information service</Definition>
–   <Term termID=“13.1”>
    <Name xml:lang=“en”>POI/Name>
    </Term>
–   <Term termID=“13.2”>
    <Name xml:lang=“en”>PTI</Name>
    </Term>
    </Term>
–   <Term termID=“14”>
    <Name xml:lang=“en”>BIFS</Name>
    <Definition xml:lang=“en”>By using BIFS defining an
interaction between object which are various with an
image, a text, and etc., it services with the addtional
information providing of AV</Definition>
    </Term>
–   <Term termID=“15”>
    <Name xml:lang=“en”>Java Midlet</Name>
    <Definition xml:lang=“en”>The application service which
is executable in the round wave DMB environment</Definition>
    </Term>
–   <Term termID=“16”>
    <Name xml:lang=“en”>Timed Text</Name>
    <Definition xml:lang=“en”>The index grade marking
service for a karaoke and studying language</Definition>
    </Term>
    </ClassificationScheme>
```

The source location information may include broadcasting event information, bidirectional service information, content reference information, and location information of content corresponding to the content reference information.

The broadcasting event information may be expressed as ‘BroadcastingEvent’ and provide information on a source broadcasting channel and a time that a user obtains content. The broadcasting event information provides information on a broadcasting station for a program scheduled to be currently broadcasted, purchase information for a program, coupon information, attributes of audio/video (AV), thereby enabling a user to confirm information related to the purchase information of the program that a user obtains, such as a price or coupon usage.

The bidirectional service information may be expressed as 'OnDemandProgram' and provide information on a bidirectional service for obtaining contents.

The content reference information may be expressed as 'ContentIdRef'. The content reference information may be used to refer source location information of other contents, not describing source location information of corresponding content.

The content location information may be expressed as 'imi' and define a location of corresponding content in the content reference information.

The broadcasting event information may include program information, instant description information, broadcasting start information, and broadcasting time information. The program information may be expressed as 'Program' and may include content reference identification information. The instant description information may be expressed as 'InstanceDescriptor' and describe instances of content. The broadcasting start information may be expressed as 'PublishedStartTime' and provide information on what time a program starts to a user. The broadcasting time information may be expressed as 'PublishedDuration' and provide information a duration of broadcasting a program to a user.

The instant description information may include purchase list information as lower components. The purchase list information may be expressed as 'PurchaseList'. The purchase list information may provide price information and coupon information for purchased content by providing a list of purchase contents. The purchase list information may purchase item information as lower component. The purchase item information may be expressed as 'PurchaseItem' and describe a purchase item of the purchase list information. The purchase item information may include purchase price information, purchase server address information, necessary coupon information, and obtained coupon information. The purchase price information may be expressed as 'Price' and describe a purchase price of content. The purchase address server information may be expressed as 'PricingServerURL', and describe URL addresses of servers that provide contents. The necessary coupon information may be expressed as 'RequiredCoupon' and describe necessary coupons for obtaining contents. The obtained coupon information may be expressed as 'RewardCoupon' and describes information about a coupon provided as reward after obtaining the content.

The bidirectional service information may include program information, instance description information, availability start time information, and availability end time information. The program information may be expressed as 'Program' and include content reference ID information. The instance description information may be expressed as 'InstanceDescriptor' and describe instance of a content. Since the instance description information was already described in detail, the detail description thereof is omitted. The availability start time information may be expressed as 'StartOfAvailability', and inform a user when a program is available or whether a program is available of not. The availability end time information may be expressed as 'EndOfAvailability', and inform a user until when a user can obtain a desired program.

The segment information table information may include a segment group list information for describing a segment group which is a set of related segments, and segment list information for describing a list of segments. The segment list information may be expressed as 'SegmentList' and provide a list of accessible segments from a program to a user. The segment group list information may be expressed as 'SegmentGroupList'and enables a user to group related segments in order to watch a predetermined field. For example, the segment group list information may include information on related segments such as accidents, international news, and weather.

The segment list information may include segment information for describing a segment as lower component. The segment information may be expressed as 'SegementInformation' and inform a user what information individual segment has.

As lower components, the segment information program information of a program where segments belong to, time information for segments, context description information for segments, segment location information for describing segment locations, representative image information of a segment. The program information may be expressed as 'ProgramRef' and provide identification (CRID) of a program where current segments belong to. The time information may be expressed as 'TimeBaseReference' and provide information for random accessing segments by informing a difference time value in a segment group where the current segment belongs to. The context description information may be expressed as 'Description' and inform a user what context the current segment has. The segment location information may be expressed as 'SegmentLocator'. The segment location information is information on what a start time of a current segment is in a program and how long it will be reproduced in order to enable a user to reproduce a desired segment. The representative image information may be expressed as 'KeyFrameLocator'. The representative image information is information on a representative image for individual segment for visually showing a representative image when a user selects a corresponding segment.

The context description information may include a title information, synopsis information, genre information, credit list information, related content information, and reward coupon information for coupon provided according to consumption of a segment. The title information may be expressed as 'Title' and provide a title of content to a user. The synopsis information may be expressed as 'Synopsis' and provide a plot of contents to a user. The genre information may be expressed as 'Genre' and provide information for genre such as drama and sport to a user. The related content information may be expressed as 'RelatedMaterial' and provide information on related other contents. The credit list information may be expressed as 'CredisList' and provide detail information for individuals in contents such as a hero, a heroine, and a director. The reward coupon information may be expressed as 'RewardCoupon' and inform a user of information on coupons provided as reward for consumption of segments. For example, a user obtains a coupon for consuming an advertisement.

The reward coupon information may include coupon description information for describing coupons as a lower component. The coupon description information may be expressed as 'CouponDescription' and describe information on coupons.

The coupon description information may include a required coupon information for describing necessary coupons, coupon value information for defining a value of a coupon, a content target information for describing content where a coupon is applied to, and coupon text information for describing about a coupon. The required coupon information may be expressed as 'RequiredCoupon' and clearly define coupons that a user must have before the present coupon is valid. For example, if the number of required coupons is not one, a user must have all of the required coupons. That is, if the required coupon information is used, it means that at least two coupons are minimally required. The coupon value information may be expressed as 'CouponValue' and defines a value of a coupon expressed as a discount amount, a discount rate, and a content price after discount. The context target information may be expressed as 'ContentTarget' and stores content where a coupon is applied to. The coupon text information may be expressed as 'CouponText' and describe information on a coupon.

The coupon value information includes discount information for describing a discount value according to a coupon as a lower component. The discount information may be expressed as 'ReductionAmount'. The discount information describes an amount discounted from a price provided in purchase item information as the coupon is applied to. As a lower component of the content target information, the content target information may include content reference identification information of a content where a coupon is applied to. The content identification reference information may be expressed as 'Program' and describe content where a coupon is applied to.

The segment group list information may include segment group information for describing a segment group. The segment group information may be expressed as 'SegmentGroupInformation', and show a group of related segments to a user.

The segment group information includes program information on a program that a segment group belongs to, time information for a segment group, a group type information for describing relation between segment groups, context description information for a segment group, list information for a list of segments included in a segment group, a lower group information for describing a lower segment group for a segment group, and representative image information for a representative image for a segment group. The program information may be expressed as 'ProgranRef', and include identification information for a segment group. The time information may be expressed as 'TimeBaseReference', and describe a time axis to be applied to regions where the present region group belongs to. The group type information may be expressed as 'GroupType' and inform a user what relation a segment group has. For example, the group type information informs a user of highlight, bookmark, and ToC in order to enable a user to conveniently watch a desired part of a program. The context description information may be expressed as 'Description'. The context description information is information what context a segment group has. When a user selects a predetermined segment group, the context description information provides overall information of the selected segment group. The list information may be expressed as 'Segments' and provide a list of available segments in order to enable a user to select a desired segment from the list. The lower group information may be expressed as 'Groups' and provides information to a user to select a subgroup when a current segment group includes subgroups. The representative image information may be expressed as 'KeyFrameLocator' and enables a user to easily see what segments are gathered by showing a representative image of a segment group.

If metadata has a structure like FIG. 1, the lower components thereof are included in the upper components. Although the metadata includes the hierarchical structure shown in FIG. 1 in the present embodiment, the present invention is not limited thereto.

Second Embodiment

An Apparatus for Generating a Digital Multimedia Broadcasting Application Format (DMB AF)

An apparatus for generating a DMB AF in accordance with another embodiment of the present invention includes a metadata generator for generating metadata for DMB contents and a combiner for combining the generated metadata and contents. The metadata includes copyright information for metadata, user information for a user who consumes content, and package table information for describing items related to content.

The apparatus for generating a DMB AF according to the present invention includes a server, a service provider server, and a user terminal.

Since the metadata was described in detail in the first embodiment, the detail description is omitted in the second embodiment.

Third Embodiment

Method for Consuming a DMB AF

The method for consuming a DMB AF according to another embodiment of the present invention includes receiving a DMB AF having DMB broadcasting content and metadata for the DMB contents and consuming DMB contents using the DMB AF. The metadata includes copyright information for metadata, user information for a user who consumes the DMB contents, and package table information for describing items related to the DMB contents.

A method for consuming a DMB AF in a user terminal is one of example of the DMB AF consuming method according to another embodiment. The consumption is not limited to using contents. The consumption may also be distribution or modification of the DMB application.

When a DMB AF having DMB contents and metadata thereof is received, DMB contents are consumed using the received DMB AF. Here, when a DMB AF is received as one file, the DMB AF consuming method according to the present embodiment may include separating DMB contents and metadata thereof. In this case, a user may consume DMB contents using information of metadata for the DMB contents.

Since the metadata was described in detail in the first embodiment, the detail description thereof is omitted.

Fourth Embodiment

Apparatus for Consuming a DMB AF

An apparatus for consuming DMB AF according to another embodiment includes a receiver for receiving a DMB AF having DMB contents and metadata thereof, and a consuming unit for consuming the DMB contents using the received DMB AF. The metadata includes copyright information for metadata, user information for a user who consumes DMB contents, and package table information for describing items related to DMB contents.

The DMB AF consuming apparatus includes a server, a service provider server, and a user terminal. The consumption is not limited to using contents. The consumption may also be distribution or modification of the DMB application.

Since the metadata was described in detail in the first and second embodiments, the detail description thereof is omitted.

Fifth Embodiment

Computer-Readable Recording Medium

A computer-readable recording medium for storing metadata for DMB contents includes copyright information for metadata, user information for a user who consumes DMB contents, and package table information for describing items related to DMB contents.

The metadata may be distributed or stored as computer-readable recording medium. Since the metadata was described in detail in the first embodiment, the detail description thereof is omitted.

The above described method according to the present invention can be embodied as a program and stored on a computer-readable recording medium. The computer-readable recording medium is any data storage device that can store data which can be thereafter read by the computer system. The computer-readable recording medium includes a read-only memory (ROM), a random-access memory (RAM), a CD-ROM, a floppy disk, a hard disk and an optical magnetic disk.

While the present invention has been described with respect to the specific embodiments, it will be apparent to those skilled in the art that various changes and modifications may be made without departing from the spirit and scope of the invention as defined in the following claims.

INDUSTRIAL USABILITY

The present invention is used to provide and consume digital multimedia broadcasting contents.

What is claimed is:

1. A method for generating Digital Multimedia Broadcasting (DMB) Application Format (AF), comprising:

generating, by a processor, metadata for DMB contents; and combining, by the processor the generated metadata and the DMB contents in an AF, wherein the metadata includes copyright information for the metadata, user information for a user who consumes the DMB contents, and package table information for describing a package related to the DMB contents, wherein the package table information includes content type information, wherein the package table information includes segment information table information for segments, wherein the content type information includes a classification scheme, wherein the segment information table information provides a method for accessing, reproducing or watching programs of the DMB contents by segments to the user, provides a browsing service, and wherein the segment information table information includes segment group list information for describing a segment group which is a set of related segments and describing a list of the segments.

2. The method of claim 1, wherein the user information includes: user preference information having identification information and preference information for a user in order to describe preference of the user for the DMB contents; and usage history information having identification information for the user and action history information for the user for the DMB contents.

3. The method of claim 1, wherein the content type information includes classification scheme including a slide show, a broadcasting web site (BWS), traffic and travel information (TTI), binary format for scenes (BIFS), Java middlet, and a timed text.

4. An apparatus comprising a processor and memory for generating Digital Multimedia Broadcasting (DMB) Application Format (AF), comprising:

a metadata generator, operating on the processor, for generating metadata for DMB contents; and a combiner, operating on the processor, for combining the generated metadata and the DMB contents in an AF, wherein the metadata includes copyright information for the metadata, user information for a user who consumes the DMB contents, and package table information for describing a package related to the DMB contents, wherein the package table information includes content type information, wherein the package table information includes segment information table information for segments, wherein the content type information includes a classification scheme, wherein the segment table information provides a method for accessing, reproducing or watching programs of the DMB contents by segments to the user, provides a segment browsing service, and wherein the segment information table information includes segment group list information for describing a segment group which is a set of related segments and segment list information for describing a list of the segments.

5. The apparatus of claim 4, wherein the user information includes: user preference information having identification information and preference information for a user in order to describe preference of the user for the DMB contents; and usage history information having identification information for the user and action history information for the user for the DMB contents.

6. The apparatus of claim 4, wherein the content type information includes classification scheme including a slide show, a broadcasting web site (BWS), traffic and travel information (TTI), binary format for scenes (BIFS), Java middlet, and a timed text.

7. A method for consuming a Digital Multimedia Broadcasting (DMB) Application Format (AF), comprising:

receiving, by a processor, a DMB AF having DMB contents and metadata for the DMB contents in an AF; and consuming, by the processor, the DMB contents using the DMB AF, wherein the metadata includes copyright information for the metadata, user information for a user who consumes the DMB contents, and package table information for describing a package related to the DMB contents, wherein the package table information includes content type information, wherein the package table information includes segment information table information for segments, wherein the content type information includes a classification scheme, wherein the segment information table information provides a method for accessing, reproducing or watching programs of the DMB contents by segments to the user, provides a segment browsing service, and wherein the segment information table information includes segment group list information for describing a segment group which is a set of related segments and segment list information for describing a list of the segments.

8. The method of claim 7, wherein the user information includes: user preference information having identification information and preference information for a user in order to describe preference of the user for the DMB contents; and usage history information having identification information for the user and action history information for the user for the DMB contents.

9. The method of claim 7, wherein the content type information includes classification scheme including a slide show, a broadcasting web site (BWS), traffic and travel information (TTI), binary format for scenes (BIFS), Java middlet, and a timed text.

10. An apparatus comprising a processor and memory for consuming a Digital Multimedia Broadcasting (DMB) Application Format (AF), comprising:

a receiver, operating on the processor, for receiving a DMB AF having DMB contents and metadata for the DMB contents in an AF; and a consuming unit, operating on the processor, for consuming the DMB contents using the DMB AF, wherein the metadata includes copyright information for the metadata, user information for a user who consumes the DMB contents, and package table information for describing a package related to the DMB contents, wherein the package table information includes content type information, wherein the package table information includes segment information table information for segments, wherein the content type information includes a classification scheme, wherein the segment information table information provides a method for accessing, reproducing or watching programs of the DMB contents by segments to the user, provides a segment browsing service, and wherein the segment information table information includes segment group list information for describing a segment group which is a set of related segments and segment list information for describing a list of the segments.

11. The apparatus of claim 10, wherein the user information includes: user preference information having identification information and preference information for a user in order to describe preference of the user for the DMB contents; and usage history information having identification information for the user and action history information for the user for the DMB contents.

12. The apparatus of claim 10, wherein the content type information includes classification scheme including a slide show, a broadcasting web site (BWS), traffic and travel information (TTI), binary format for scenes (BIFS), Java middlet, and a timed text.

13. A non-transitory computer-readable recording medium for storing metadata for Digital Multimedia Broadcasting (DMB) contents, wherein the metadata includes copyright information for the metadata, user information for a user who consumes the DMB contents, and package table information for describing a package related to the DMB contents, wherein the package table information includes content type information, wherein the package table information includes segment information table information for segments, wherein the content type information includes a classification scheme, wherein the segment information table information provides a method for accessing, reproducing or watching programs of the DMB contents by segments to the user, provides a segment browsing service, wherein the segment information table information includes segment group list information for describing a segment group which is a set of related segments and segment list information for describing a list of the segments.

14. The non-transitory computer-readable recording medium of claim 13, wherein the user information includes: user preference information having identification information and preference information for a user in order to describe preference of the user for the DMB contents; and usage history information having identification information for the user and action history information for the user for the DMB contents.

15. The non-transitory computer-readable recording medium of claim 13, wherein the content type information includes classification scheme including a slide show, a broadcasting web site (BWS), traffic and travel information (TTI), binary format for scenes (BIFS), Java middlet, and a timed text.

* * * * *